(12) United States Patent
Mahe (10) Patent No.: US 9,526,303 B2
(45) Date of Patent: Dec. 27, 2016

(54) MOLDED CATCHING ELEMENTS AND METHOD FOR MANUFACTURING SAME

(71) Applicant: APLIX, Le Cellier (FR)

(72) Inventor: Anthony Mahe, St. Julien de Concelles (FR)

(73) Assignee: APLIX, Le Cellier (FR)

(*) Notice: Subject to any disclaimer, the term of this patent is extended or adjusted under 35 U.S.C. 154(b) by 54 days.

(21) Appl. No.: 14/647,841

(22) PCT Filed: Sep. 24, 2013

(86) PCT No.: PCT/FR2013/000251
§ 371 (c)(1),
(2) Date: May 28, 2015

(87) PCT Pub. No.: WO2014/083245
PCT Pub. Date: Jun. 5, 2014

(65) Prior Publication Data
US 2015/0313320 A1    Nov. 5, 2015

(30) Foreign Application Priority Data

Nov. 28, 2012 (FR) ...................... 12 03217

(51) Int. Cl.
| A44B 18/00 | (2006.01) |
| B29C 45/00 | (2006.01) |
| B29C 45/44 | (2006.01) |
| B29C 43/22 | (2006.01) |

(Continued)

(52) U.S. Cl.
CPC ....... *A44B 18/0049* (2013.01); *A44B 18/0053* (2013.01); *A44B 18/0061* (2013.01); *B29C 43/222* (2013.01); *B29C 45/0001* (2013.01); *B29C 45/4407* (2013.01); *B29K 2101/12* (2013.01); *B29K 2995/0039* (2013.01); *B29L 2031/729* (2013.01); *Y10T 24/2792* (2015.01)

(58) Field of Classification Search
None
See application file for complete search history.

(56) References Cited

U.S. PATENT DOCUMENTS

| 6,258,311 B1 | 7/2001 | Jens et al. |
| 6,533,981 B1 | 3/2003 | Jens et al. |

(Continued)

*Primary Examiner* — Robert J Sandy
*Assistant Examiner* — Michael Lee
(74) *Attorney, Agent, or Firm* — Renner, Kenner, Grieve, Bobak, Taylor & Weber (57) ABSTRACT

The invention relates to a catching element of a male-female or male-male self-gripping device, which comprises a rod portion (1) and a catching portion (2), the rod portion extending in an axis that is transverse to a base strip (B) and the catching portion projecting laterally from the rod portion, characterized in that at least the catching portion is made of a thermoplastic material having a bending modulus of more than 1000 MPa, specifically more than 1200 MPa, in particular more than 1500 MPa at 25° C., the catching element being produced by molding, specifically by injection molding, and when the thermogram is plotted for the hook, in other words when differential scanning calorimetry is carried out, an absence or almost-absence of relaxation enthalpy near the glass transition can be seen during the first rise in temperature.

14 Claims, 6 Drawing Sheets

(51) Int. Cl.
*B29K 101/12* (2006.01)
*B29L 31/00* (2006.01)

(56) References Cited

U.S. PATENT DOCUMENTS

| | | | |
|---|---|---|---|
| 7,319,077 B2* | 1/2008 | Mehta | C08L 23/10 428/296.7 |
| 2003/0100878 A1* | 5/2003 | Leak | A61F 13/622 604/386 |
| 2006/0220271 A1* | 10/2006 | Jackson | A44B 18/0049 264/166 |
| 2007/0022602 A1 | 2/2007 | Kingsford et al. | |
| 2007/0135541 A1* | 6/2007 | Chundury | C08K 9/04 524/128 |

* cited by examiner

MOLDED CATCHING ELEMENTS AND METHOD FOR MANUFACTURING SAME

The present invention relates to a male part of a male-female (hook-in-loop type) or male-male (hook-in-hook type) touch-and-close fastener which comprises a shank and a catching part protruding laterally from the shank. It may, in particular, relate to hook-shaped or mushroom-shaped elements. The present invention also relates to male-female or male-male touch-and-close devices comprising a male element of this kind. The present invention also relates to a method of manufacturing a male element of this kind and to a plant for the manufacture of male elements of this kind.

Hook-shaped or mushroom-shaped male elements, which hereinafter will be referred to in general as catching elements, which are made by molding from thermoplastic, are already known in the prior art. The mold is made up of cavities of a shape that complements the catching elements and that are filled with molding thermoplastic and then demolded by stripping them from the cavities.

As far as the mushrooms are concerned, only those that have a very thin head can be manufactured in this way. The disadvantage is that the catching is then not very well able to withstand the various stresses, notably the peeling traction when the mushroom constitutes one of the parts of a touch-and-close fastener. The problem is that if a thick head is to be obtained, it can no longer be stripped from the molding cavity. As far as hook-shaped catching elements are concerned, these are a little easier than mushrooms to manufacture by molding. However, the need to be able to strip them from the molding cavity leads to constraints on the manufacture in terms of shape and material, in particular, and these mean that the hooks obtained are of mediocre catching quality. In particular, it would be nice to be able to produce hooks of this kind from an amorphous or substantially amorphous thermoplastic, namely from a thermoplastic containing within it a notable percentage of rigid amorphous thermoplastic. Now, as such materials are particularly rigid (having a bending modulus of at least 1000 MPa, in particular higher than 1200 MPa, notably higher than 1500 MPa, or even 2000 MPa), it is impossible to make them into hooks with a demolding that simply consists in ejecting them from the molding cavity (even though this kind of demolding is particularly favored for large-scale manufacture), because once the hooks have be stripped or ejected from the mold, they are too degraded to have the slightest catching ability.

The present invention seeks to overcome the disadvantages of the prior art by proposing a method which allows male or catching elements of the kind mentioned hereinabove to be manufactured by molding from an amorphous or substantially amorphous thermoplastic material, with ejection or stripping from the molding cavity, this being highly favored in terms of large-scale industrial production.

According to the invention, a method of manufacturing a catching element comprising a shank part extending from a base band along a shank axis transverse to the base band and a catching part protruding laterally from the shank in a direction transverse to the axis of the shank, which method comprises the following steps:
- a molding cavity of a shape that complements the catching element is provided;
- the molding thermoplastic is introduced into the molding cavity in a form that can flow, notably in a viscous or pasty form;
- the temperature of the thermoplastic inside the molding cavity is regulated to a value Tmold comprised between Tg−ΔTg and Tg+ΔTg, Tg being the glass transition temperature of the thermoplastic and ΔTg being equal to about 30° C., preferably to about 15° C.;
- the element is demolded at this temperature Tmold; and
- the demolded element is left to cool at a temperature lower than Tmold, notably at ambient temperature.

According to one preferred embodiment, the thermoplastic is amorphous or substantially amorphous and ΔTg is equal to around 15° C.

For preference, the temperature Tmold of the thermoplastic in the molding cavity is regulated by bringing the molding cavity to the temperature Tmold.

For preference, the thermoplastic is introduced into the molding cavity at a temperature Tintro higher than the temperature Tmold and the temperature of the material is left to reach the temperature Tmold of the molding cavity before the demolding step is begun.

The present invention also relates to a catching element, notably a hook or a mushroom, of a male-female or male-male touch-and-close device which comprises a shank part and a catching part, the shank part extending along an axis transverse to a base band and the catching part protruding laterally from the shank part, characterized in that at least the catching part is made of a thermoplastic having a flexural modulus greater than a 1000 MPa, notably greater than 1200 MPa, particularly greater than 1500 MPa at 25° C., the hook element being produced by molding, notably injection molding, and when the thermogram for the catching element is plotted, namely when differential scanning calorimetry is performed, an absence or near-absence of relaxation enthalpy in the vicinity of the glass transition is noticed at the first rise in temperature.

For preference, the shank part is also made of a thermoplastic having a flexural modulus greater than 1000 MPa, notably greater than 1200 MPa, particularly greater than 1500 MPa at 25° C., notably is made of the same material as the catching part.

According to one preferred embodiment of the invention, the thermoplastic is an amorphous or substantially amorphous material.

For preference, the material has a flexural modulus greater than 1500 MPa at 25° C.

Thus, according to the invention, it has been possible for the first time to manufacture a catching element from a highly rigid, notably amorphous, thermoplastic having good catching ability using a molding step that involves demolding by ejection or stripping, which is particularly favored for large-scale production.

According to one preferred embodiment of the invention, the amorphous thermoplastic contains an ABS (acrylonitrile butadiene styrene), a PC (polycarbonate) a PVC (polyvinyl chloride), a PET (polyetherimide), a PES (polyethersulfone), a PMMA (polymethyl methacrylate), a PA (polyamide) 6,6 and/or a PS (polystyrene).

According to one preferred embodiment of the invention, the catching element has the shape of a mushroom, and notably the head part protrudes laterally from the shank part over 360° around the shank part.

In particular, according to one preferred embodiment of the invention, the catching part protrudes laterally from the shank section in at least three angularly separated angular sectors.

For preference, the absence or near-absence of relaxation enthalpy corresponds on the DSC curve to a specific relaxation enthalpy less than or equal to 1 J/g, the specific relaxation enthalpy being the ratio of the area between the curve on the first temperature rise and the curve on the second temperature rise in a zone ranging from Tg to Tg−30° C., divided by the mass of the sample.

For preference, the absence or near-absence of relaxation enthalpy corresponds to the absence of a peak or maximum point for the curve of the first rise in temperature of the DSC in a zone comprised between Tg and Tg−30° C.

According to the invention, an amorphous material means a material of which the level of crystallinity within the material is 0%.

According to the invention, substantially amorphous means a material containing amorphous zones and non-amorphous zones, the amorphous zones representing more than half of the volume of the material in question. For preference, it represents more than 60%, more preferably still, more than 70%, very preferably, more than 80%, and very advantageously, more than 95%.

Some preferred embodiments of the invention are now described by way of example with reference to the drawings, in which.

Figure 1:
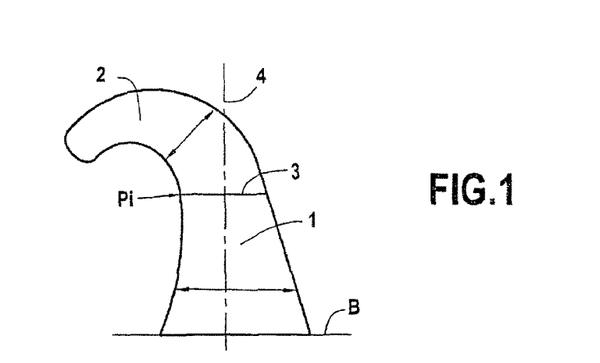
FIG. 1 depicts a side view of a hook according to the invention.

FIG. 1 depicts one embodiment of a hook according to the invention. This hook consists of a shank-forming part 1 derived from a base band B, and of a head part 2 protruding laterally from the shank part 1.

The shank part 1 extends along a substantially vertical axis, namely an axis perpendicular to the base band B. However, according to other embodiments, it is possible to contemplate this direction being inclined with respect to the perpendicular to the base band B. In order to define the demarcation 3 between the shank and the catching part, which consists of a plane of section parallel to the base band B in FIG. 1, the cross section is defined, according to the invention, parallel to the base plane B of the hook part and, according to the invention, the demarcation between the head part and the base part is defined as being the plane 3 beyond which the point Pi of the cross section, which is the point of the cross section furthest towards the outside on the side toward which the hook extends (here in FIG. 1 the left-hand side) lies furthest toward the right. Once this cross section 3 has been determined, it is then considered, according to the invention, that the shank part is the part of the hook that lies below this cross section 3 and the hook part is the part 2 which lies above this cross section 3.

Figure 2A:
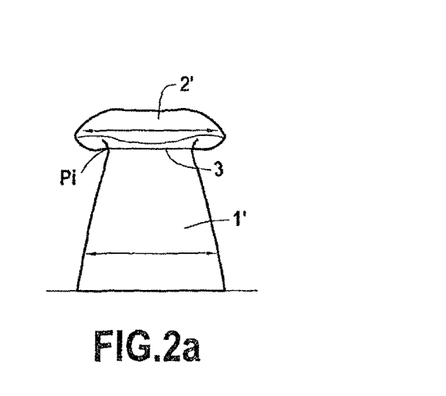
FIGS. 2a and 2b depict a side view and a plan view of a mushroom-shaped hook element according to the invention.
Figure 2B:
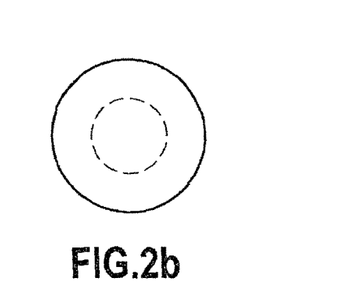

FIGS. 2a and 2b depict a male element according to the invention in the shape of a mushroom. As can be seen in FIG. 2a, it too consists of a shank part 1' and of a head part 2', the point Pi being depicted in the figure as being the furthest to the left of the cross section 3 beyond which this point Pi begins to move back toward the left in the figure. According to this embodiment, which exhibits symmetry of revolution about the vertical axis, all of the points on the cross section 3 are points Pi.

FIG. 2b shows the mushroom of FIG. 2a in plan view from above.

Figure 3:
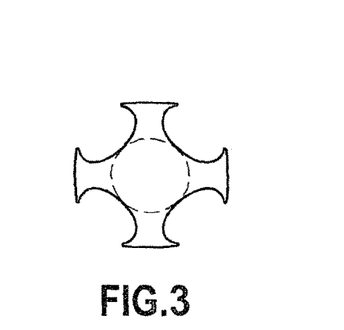
FIG. 3 depicts a plan view of a hook element of another embodiment of the invention.
Figure 4:
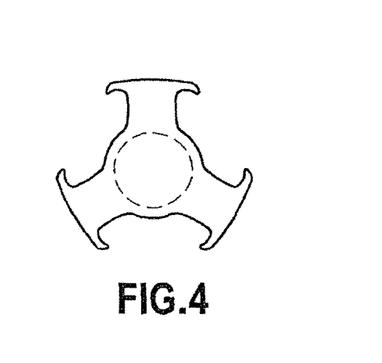
FIG. 4 depicts a plan view of a hook element according to yet another embodiment.

FIGS. 3 and 4 depict different embodiments, in which the hook has a shank identical to that of the mushroom of FIG. 2a, whereas by contrast the head part protrudes laterally from the shank only over angular sectors (four angular sections in FIG. 3, three angular sectors in FIG. 4).

The method according to the invention advantageously allows hooks such as those described in FIGS. 1 to 4 and, yet more notably, mushrooms like in FIGS. 2a, 2b, 3 and 4, to be manufactured by molding, and, notably, by injection molding, despite the difficulty associated with the existence of the head part that has to be demolded. Thus, according to the invention, the method for manufacturing such hooks consists in taking a molding cavity of a shape that complements the hook or the mushroom that is to be produced, in introducing amorphous thermoplastic, for example PEI, PES, PVC, polystyrene, ABS, etc., into the molding cavity.

Heating means are used to bring the molding cavity up to a temperature Tmold which is substantially equal to the glass transition temperature (Tg) of the thermoplastic, being comprised in a range extending from Tg −20 to 30° (preferably 10 to 15°) up to Tg+20 to 30° (preferably 10 to 15°). Because the material was introduced at a temperature Tintro higher than Tmold, it is left to reach this temperature Tmold, then the hook is demolded at this temperature Tmold. The hook is then left to cool to ambient temperature. It is found that the hook obtained is perfectly demolded (see for example FIG. 7B) and, in particular, unlike in the prior art, has not been deformed or damaged (see FIG. 7B) by demolding as compared with the complementary shape of the molding cavity. It has thus been possible to produce hooks having very hooked catching parts as well as mushrooms the head part of which protrudes laterally all around the periphery of the shank with large head thickness, without this presenting the slightest problem of the hook becoming damaged during demolding.

Resistive heating elements, induction systems, a fluid regulating circuit using water or oil for example, or any other similar system well known in the art may be provided by way of heating means.

Thus, using the method according to the invention, hooks of the above kind, notably hooks with a good ability to catch, and mushrooms, can be produced by molding using ejection or stripping, something which is particularly well suited to large-scale manufacture.

FIGS. 5A, 53, 5C, 5D, 5E, 6A and 6B depict one way of demonstrating that the hook according to the invention has been manufactured using the method according to the invention (FIGS. 5A, 5B, 5C, 5D and 5E) and, in particular, has not, unlike in the prior art (FIGS. 6A and 6B), been damaged by the demolding operation. It should be noted that the materials of FIGS. 5D and 5E (PMMA and PC) cannot be demolded using a method of the prior art.

Figure 5A:
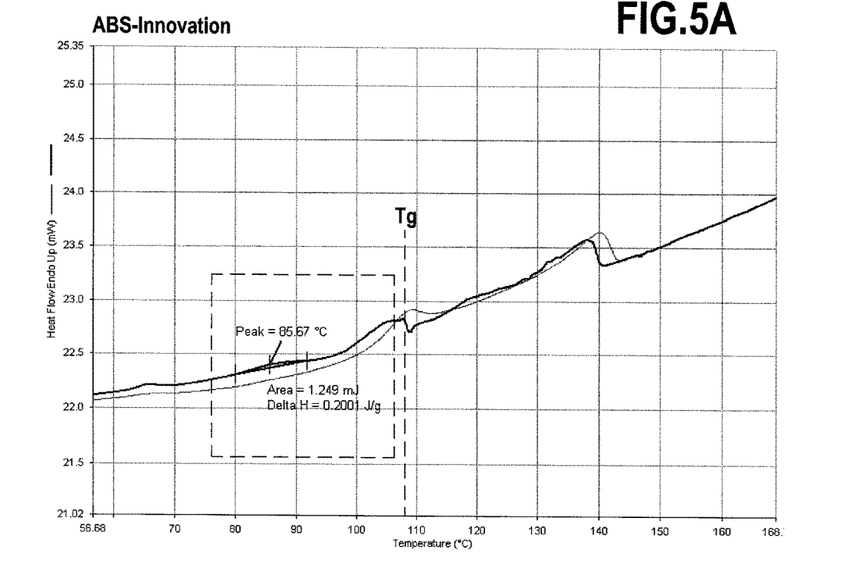
FIGS. 5A, 5B, 5C, 5D and 5E depict the DSC (differential scan calorimetry) curve for the first rise in temperature for a catching element according to the invention made respectively of ABS, PS, PA-6,6, PMMA and PC.
Figure 5B:
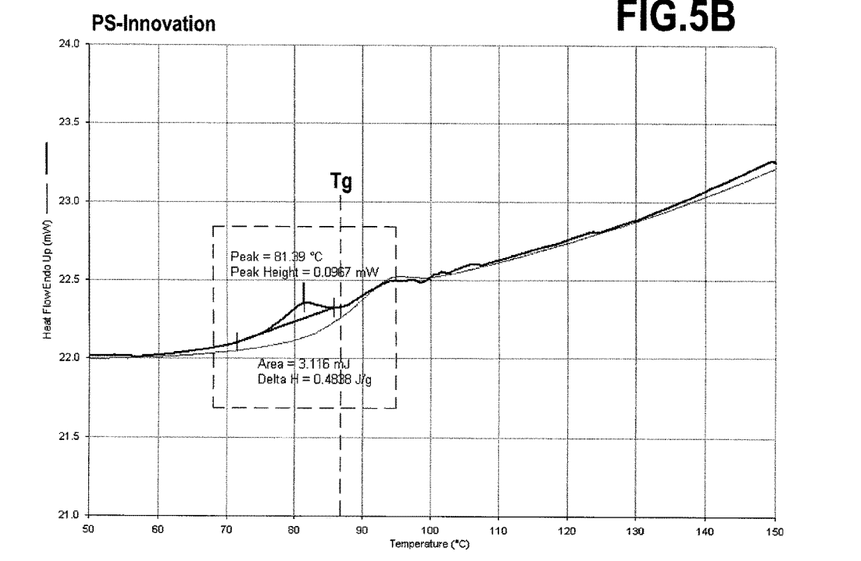
Figure 5C:
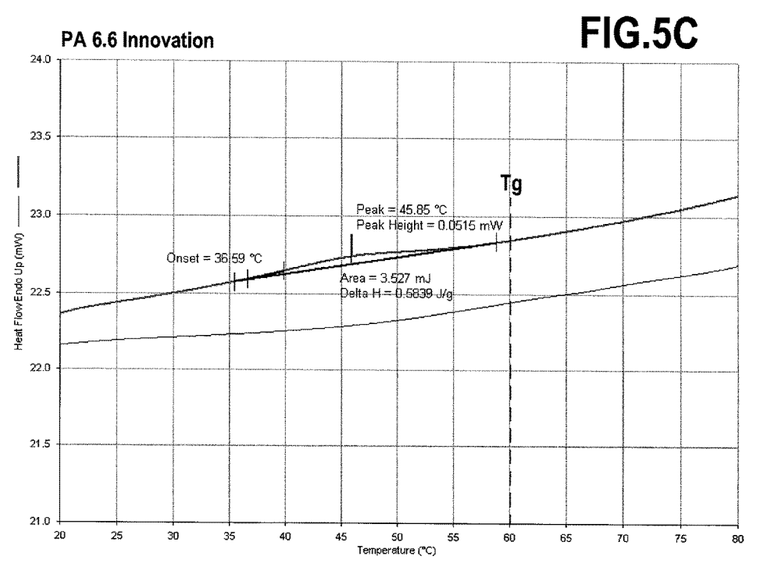
Figure 5D:
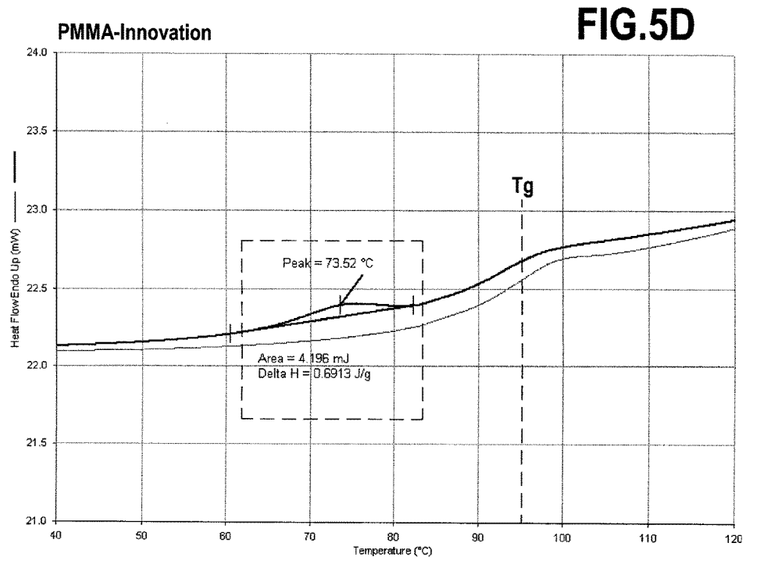
Figure 5E:
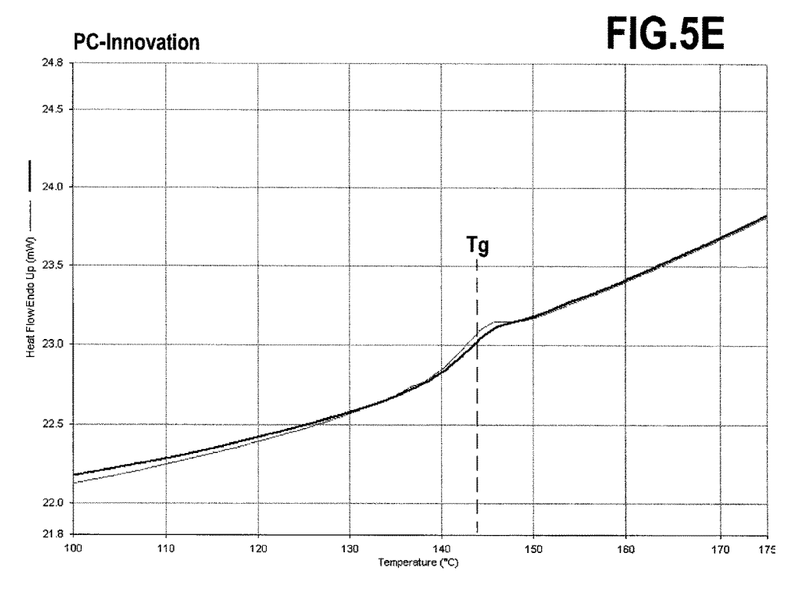
Figure 6A:
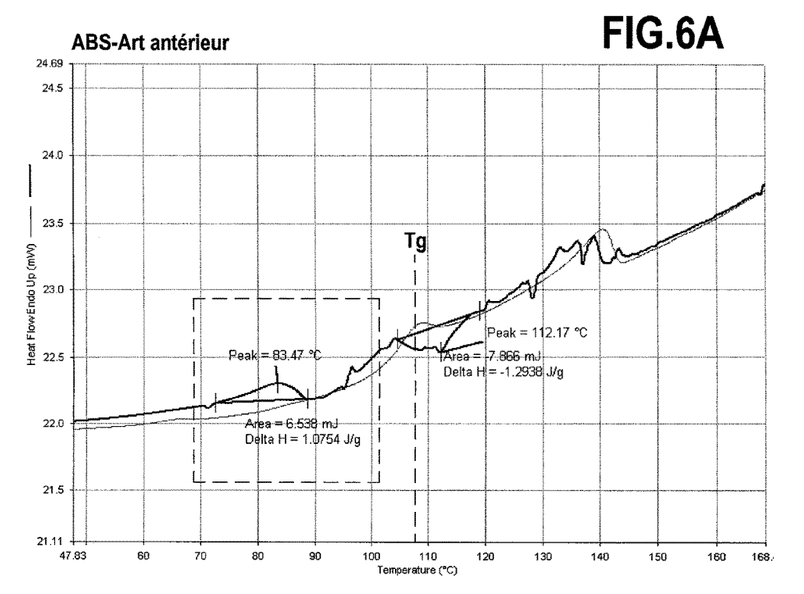
FIGS. 6A, 6B and 6C respectively depict the same curves as in FIGS. 5A, 5B and 5C for an element obtained according to a method of the prior art in which demolding is not performed in accordance with the invention.
Figure 6B:
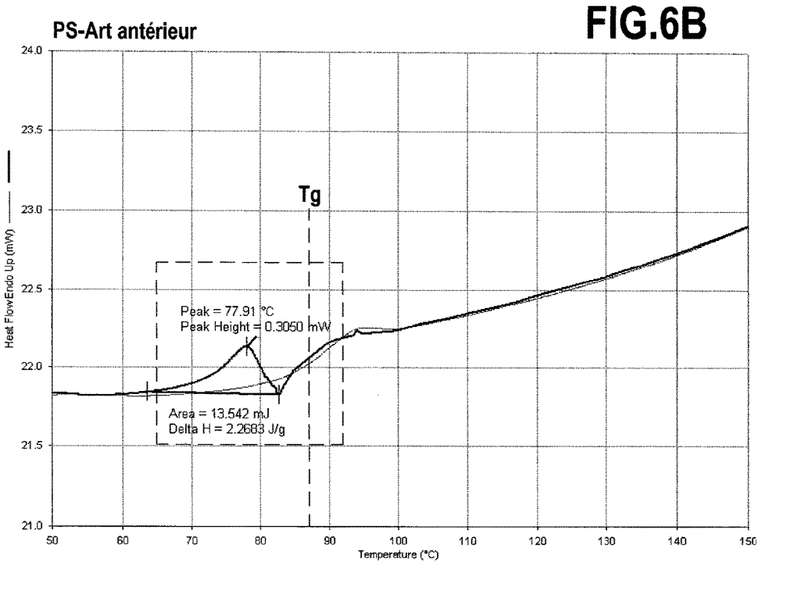
Figure 6C:
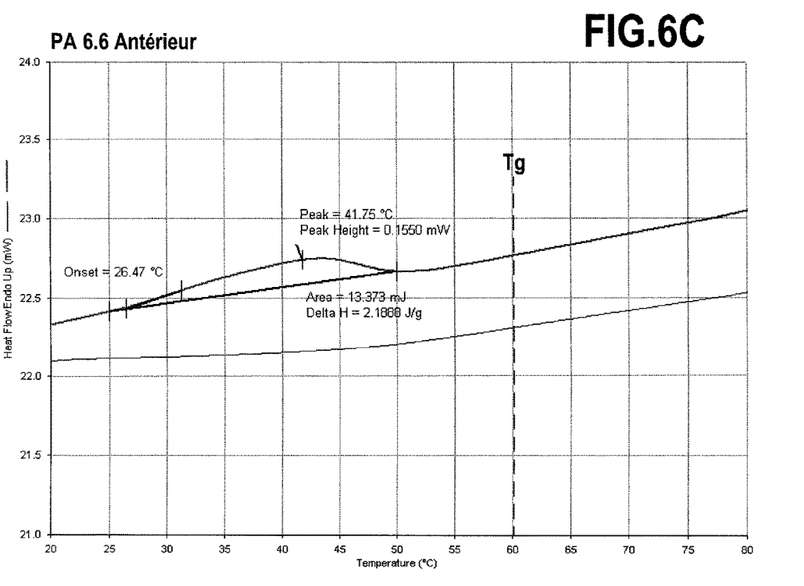

Thus, FIGS. 5A, 5B, 5C, 5D and 5E respectively depict a DSC for a hook according to any one of FIGS. 1 to 4 made respectively of ABS, PS, PA-6,6, PMMA and PC, and FIGS. 6A, 6B and 6C respectively depict a DSC for a hook made respectively of ABS, PS and PA-6,6 which has not been demolded at the temperature intended according to the invention.

A DSC is a curve which gives the instantaneous quantity of heat variation in the quantity of heat to be supplied in order to obtain an increase in temperature, as a function of temperature.

The heavy deformation that a catching element suffers when being demolded leaves residual strain within the material of which it is made. During DSC, for a temperature range situated around Tg, the material needs a significant amount of heat to be supplied in order to eliminate this strain and continue to rise in temperature. This then is an endothermic phenomenon, the sample absorbing heat, this absorption being characterized by a peak, which peak no longer, or almost no longer, appears upon a further rise in temperature, as the strains have been greatly reduced, if not eliminated.

FIG. 5A depicts the curve obtained for a hook made of ABS according to the invention during a first rise in temperature, namely as the temperature is varied from 10 to 200° Celsius at a fixed rate of 10° C./min.

As can be seen in FIG. 6A, in the first pass, a peak, namely a point at which the derivative of the curve is zero and corresponds to a local maximum (characterizing a relaxation enthalpy and an endothermic reaction), is obtained before the glass transition temperature and in the vicinity thereof. By contrast, according to the invention, there is no or practically no such maximum point in the region of the glass transition (see FIG. 5A).

A near absence of a peak or maximum point in the vicinity of the glass transition (and therefore a near absence of relaxation enthalpy) means that the DSC curve is substantially rectilinear, and notably that the area of the zone contained between the curve on the first pass and the curve on the second pass per unit mass (delta H) which is less than 1 J/g.

In the method according to the invention, the molding cavity can be raised to the temperature intended for the demolding (namely to the vicinity of Tg) before or after the molding material is introduced into the cavity.

When performing the temperature-rise curves for the DSC, and notably as may be seen in FIGS. 5A to 5E and 6A to 6C, the curve for the first rise in temperature is depicted (in thick line) and the curve for the second rise in temperature is depicted (in fine line). The curve for the second rise is offset downward because, since on the second rise the hooks have already been melted once (on the first rise), contact with the device is far better so less energy is required to heat the sample, leading to this offset right from the origin.

Thus, in order to calculate the specific relaxation enthalpy in the vicinity of the peak, the second-rise curve is raised beforehand to match it to the first-rise curve. This then gives, in FIGS. 5A to 5E and 6A to 6C, over the segment [Tg−30°; Tg] the adapted curve, likewise in thick line, extending under the curve of first rise and forming therewith a closed loop the surface area of which is measured in order to calculate the enthalpy.

In particular, the specific relaxation enthalpy in the vicinity of the peak is defined as being the integral between Tg−30° and Tg of the difference between the curve of first temperature rise and the curve of second temperature rise adapted to take the above-described offset into consideration, divided by the mass of the sample. This integral of the difference corresponds to the area defined, on the one hand, at the top and at the bottom, by the two curves, respectively of first and of second rise, and, on the other hand, on the left and on the right by the vertical straight lines corresponding to T=Tg and T=Tg−30°.

In FIG. 5A, delta H is 0.2001 J/g whereas in FIG. 6A, delta H is 1.754 J/g.

In FIG. 5B, delta H is 0.4838 J/g whereas in FIG. 6B, delta H is 2.2683 J/g.

In FIG. 5C, delta. H is 0.5839 J/g whereas in FIG. 6C, delta H is 2.188 J/g.

In FIG. 5D, delta H is 0.6913 J/g (no curve possible according to the prior art).

In FIG. 5E, delta H is 0 J/g (no curve possible according to the prior art).

Figure 7A:
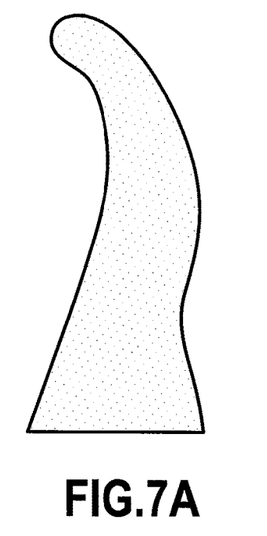
FIGS. 7A and 7B are depictions of an ABS hook made respectively using a demolding method of the prior art and by the method of the invention.
Figure 7B:
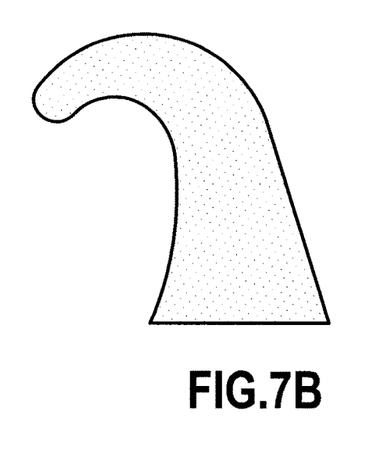

FIG. 7A depicts a hook made of ABS according to the prior art, which is highly damaged because of demolding, whereas in FIG. 7B, the ABS hook has been demolded in accordance with the invention and has not been damaged. These two figures are given by way of an illustration of the effect of the invention and are not intended to limit the scope of the present patent application, which is defined only by the claims in the light of the description. In particular, it may happen that a hook according to the invention becomes slightly deformed as it is demolded, although overall it maintains its catching properties without perfectly complementing the shape of its molding cavity. In order to determine whether a catching element is in accordance with the invention or in accordance with the prior art, what counts is the DSC analysis, not a simple visual analysis of this element.

The precise conditions in which the DSC is performed are as follows:

DSC used: Perkin-Elmer Pyris
Atmosphere: nitrogen
Test pan: aluminum with non-sealed lid
Cutting of hooks: the hooks are cut with a scalpel from the center of the sheet. They are cut at their base without taking material from the sheet.
Mass of samples: 6 mg (+ or −1 mg)
Position of hooks in the pan: the hooks are laid flat in the bottom of the pan in order to have a maximum surface area of analyzed material in contact with the bottom of the pan.
Cycle Temperature Program:
Rate of heating: 10° C./min
Temperature range: 5° C. to 225° C.
Temperature cycle:
 1. Isothermal at 5° C. for 2 min
 2. Heating from 5 to 200° C. at 10° C./min
 3. Isothermal at 200° c. for 2 min
 4. Cooling from 200 to 5° C. at 200° C./min
 5. Isothermal at 5° C. for 2 min
 6. Heating from 5 to 200° C. at 10° C./min
 7. Isothermal at 200° C. for 2 min
Processing of the Results:
Glass transition temperature (Tg) measured using the tangent method.
Relaxation enthalpy during the two heating passes measured and compared with one another, at around Tg (endothermic peak).

The precise conditions for measuring the bending modulus are as follows:

The test is performed in accordance with standard NF EN ISO 178: plastics—determination of flexural properties.

A test specimen, supported like a beam, is subjected to bending in the middle of its span, at a constant rate, until the test specimen breaks or until the deformation has reached a predetermined value. During this test, the load borne by the test specimen is measured. The ratios specified by the standard, namely l/h=20 (+/−1), where l is the length and h is the thickness, have to be conformed to.

The bending stress at the elastic limit is calculated using the formula:

$$\sigma = (3FL)/(2bh^2)$$

where F is the load in Newtons at 0.002 of strain ($\varepsilon$), L is the span in mm on the setup, b is the width and h is the thickness of the test specimen.

The bending modulus is then calculated using the formula:

$$E = \sigma/\varepsilon$$

The invention claimed is:

1. A catching element of a male-female or male-male touch-and-close device which comprises a shank part and a catching part, the shank part extending along an axis transverse to a base band and the catching part protruding laterally from the shank part, characterized in that at least the catching part is made of a thermoplastic having a flexural modulus greater than 1000 MPa at 25° C., the catching element being produced by molding, notably injection molding, and when the thermogram for the catching element is plotted, namely when differential scanning calorimetry is performed, an absence or near-absence of relaxation enthalpy in the vicinity of the glass transition is noticed at the first rise in temperature.

2. The element as claimed in claim 1, characterized in that the absence or near-absence of relaxation enthalpy corresponds on the DSC curve to a specific relaxation enthalpy less than or equal to 1 J/g, the specific relaxation enthalpy being the ratio of the area between the curve on the first temperature rise and the curve on the second temperature rise in a zone ranging from Tg to Tg−30° C., divided by the mass of the sample.

3. The element as claimed in claim 1, characterized in that the absence or near-absence of relaxation enthalpy corresponds to the absence of a peak or maximum point for the curve of the first rise in temperature of the DSC in a zone comprised between Tg and Tg−30° C.

4. The element as claimed in claim 1, characterized in that the shank part is also made of a thermoplastic having a flexural modulus greater than 1000 MPa at 25° C., and notably is made of the same material as the catching part.

5. The element as claimed in claim 4, characterized in that the thermoplastic of the shank part has a flexural modulus greater than 1200 MPa at 25° C.

6. The element as claimed in claim 4, characterized in that the thermoplastic of the shank part has a flexural modulus greater than 1500 MPa at 25° C.

7. The element as claimed in claim 1, characterized in that the thermoplastic is an amorphous or substantially amorphous material.

8. The element as claimed in claim 1, characterized in that the thermoplastic of the catching part has a flexural modulus greater than 1200 MPa.

9. The element as claimed in claim 1, characterized in that the thermoplastic of the catching part has a flexural modulus greater than 1500 MPa at 25° C.

10. The element as claimed in claim 7, characterized in that the amorphous thermoplastic is chosen from the list comprising ABS, PC, PMMA, PVC, PEI, PES and polystyrene.

11. The element as claimed in claim 1, characterized in that the element has the shape of a mushroom, and notably the head part protrudes laterally from the shank part over 360° around the shank part.

12. The element as claimed in claim 1, characterized in that the catching part protrudes laterally from the shank section in at least three angularly separated angular sectors.

13. A method of manufacturing a catching element comprising a shank part extending from a base band along a shank axis transverse to the base band and a catching part protruding laterally from the shank in a direction transverse to the axis of the shank, which method comprises the following steps:
   a molding cavity of a shape that complements the catching element is provided;
   the molding thermoplastic is introduced into the molding cavity in a form that can flow, notably in a viscous or pasty form;
   the temperature of the thermoplastic inside the molding cavity is regulated to a value Tmold comprised between Tg−ΔTg and Tg+ΔTg, Tg being the glass transition temperature of the thermoplastic and ΔTg being equal to about 30° C.;
   the element is demolded at this temperature Tmold; and
   the demolded element is left to cool at a temperature lower than Tmold, notably at ambient temperature.

14. The method of claim 13, wherein ΔTg being equal to about 15° C.

* * * * *